United States Patent [19]
Colbert

[11] Patent Number: 5,862,246
[45] Date of Patent: Jan. 19, 1999

[54] KNUCKLE PROFILE IDENTITY VERIFICATION SYSTEM

[75] Inventor: Charles Colbert, Yellow Springs, Ohio

[73] Assignee: Personal Information & Entry Access Control, Incorporated, Yellow Springs, Ohio

[21] Appl. No.: 732,688

[22] Filed: Oct. 18, 1996

Related U.S. Application Data

[63] Continuation-in-part of Ser. No. 267,584, Jun. 20, 1994, Pat. No. 5,594,806.

[51] Int. Cl.⁶ ................................................ G06K 9/00
[52] U.S. Cl. .......................................... 382/115; 382/209
[58] Field of Search ...................... 382/115, 116, 382/117, 135, 136, 100, 141, 155, 181, 190, 191, 192, 193, 194, 195, 196, 197, 198, 199, 201, 202, 203, 204, 205, 209, 216, 217, 218, 219, 220, 221, 224, 225, 226, 227, 228, 254, 266, 270, 278, 282, 283, 286, 305, 307, 308, 312, 321, 316, 323, 296, 179; 340/825.34; 356/71

[56] References Cited

U.S. PATENT DOCUMENTS

| | | | |
|---|---|---|---|
| 3,639,905 | 2/1972 | Yaida et al. | 382/115 |
| 4,607,385 | 8/1986 | Maeda | 382/209 |
| 4,736,203 | 4/1988 | Sidlauskas | 382/115 |
| 5,335,288 | 8/1994 | Faulkner | 382/4 |

*Primary Examiner*—Leo H. Boudreau
*Assistant Examiner*—Bijan Tadayon
*Attorney, Agent, or Firm*—Joseph G. Nauman

[57] ABSTRACT

A system (method and apparatus) for verifying/identifying a person based on contour of the knuckle surface of at least one hand, e.g. a digitized waveform unique to each individual. At an Enrollment Station a microcomputer is connected to a device for identifying the knuckle surface profile (e.g. a video camera or electromechanical contour sensing device). A candidate user grasps a grip handle, preferably vertically oriented, on the apparatus, positioning a fist before a viewing window and activating the device to scan or assess the fist and generate a contour of the user's knuckle surface contour. User's data comprises a knuckle contour, an assigned PIN, and optionally, information such as user's name, bank ID number, Social Security Number, and access restrictions. User's data may be stored as a profile (template) in an ID card, and/or in a master database containing data of all authorized users in a guarded system.

24 Claims, 4 Drawing Sheets

KNUCKLE PROFILE IDENTITY VERIFICATION SYSTEM

CROSS-REFERENCE TO RELATED APPLICATION

This application is a continuation-in-part of my copending U.S. patent application Ser. No. 08/267,584 filed 20 Jun., 1994, now U.S. Pat. No. 5,594,806.

FIELD OF THE INVENTION

This invention uses the fingers in grip configuration rather than extended; grasping a handle to gain access is a natural motion, however, turning the handle is not required as in the case of hardware disclosed in the parent application; the user is not aware of exactly how he is being observed, whereas other hand geometry apparatuses require finger placement in a prescribed orientation, usually extended with palm down, making it obvious that the fingers are somehow involved in the identity verification process.

BACKGROUND OF THE INVENTION

As explained in the parent application, numerous biometric hand geometry methods exist or have been proposed for verifying the identity of persons. Each method has its drawbacks. The patent literature describes numerous forms of hand geometry apparatus which generally use guides (e.g. posts, grooves, raised plates) to physically constrain the hand and fingers into prescribed positions which are not user friendly. The present invention stems from work to develop an apparatus, see U.S. Pat. No. 5,073,950 issued 17 Dec., 1991 and assigned to the assignee of this application, which relies on measuring length, width and shape (contour) of four fingers. The present invention is also an improvement on grip-type hardware disclosed in the parent application.

To avoid using physical restraints, such as guide posts, that patented apparatus uses a mathematical algorithm is disclosed in said U.S. Pat. No. 5,073,950 and used to realign or normalize the images of the four fingers to for differences in finger spread and palm orientation between the template image and the profile image, as defined below. While this normalizing or remapping process is effective, to the great relief of the users, the computational overhead can cause a delay of several seconds in the accept/reject (decision) time. This limits the apparatus to low traffic applications. A desire to avoid forcing the fingers into awkward positions, and to avoid mathematically remapping the finger images, gave rise to the present invention. The decreased and simplified verification time results in a system usable in high traffic applications.

The novel system (method and apparatus) described herein can prevent an unauthorized individual from gaining access to a restricted zone. It also can prevent an imposter from fraudulently transacting business by posing as another person.

SUMMARY OF THE INVENTION

The premise of the system provided by this invention is that the knuckle surface contour of either hand comprises a sinuous pattern or waveform, herein called a profile, which is essentially unique to each individual. Although it is possible that two different persons could have the same profile, such an occurrence is extremely unlikely.

An electronic video camera captures the frontal view of a fist. But the scan lines do not run as conventional from left to right and from the top of the image to the bottom. Instead, the camera is rotated 90 degrees counterclockwise so that the scan lines are vertical from bottom to top. Thus, what was formerly the left margin is now at the bottom of the image. And what was formerly the bottom of the image is now at the right. The abrupt change in brightness of each scan line at a point on the knuckle image is detected by a digital signal processor (DSP) edge detection circuit. The succession of these points constitutes the knuckle surface contour.

This camera scanning pattern can be made clearer by the following analogy using a printed page of unjustified text. Only the left margin is uniform. Now, rotate the page 90 degrees counterclockwise so that the uniform margin is at the bottom. Next, draw a line connecting the end of each line with its predecessor. The result is a contour.

When a user is enrolled by the apparatus for future ID verification, the knuckle contour (called a "template") is captured, digitized, and stored in a database or on the magnetic stripe of an ID card. When a user presents a fist to the apparatus for ID verification, the knuckle contour captured is called a "profile". An electronic comparator circuit matches the profile to the previously stored template. If the resulting match score equals or exceeds a predetermined threshold score, the user gains access or permission to transact. Also stored along with the user's template may be other data pertinent to the user (for example name, social security number, bank ID number, personal identification number [PIN]). An equivalent electromechanical scanning device which will produce the knuckle surface profile is also disclosed.

Several forms of handgrip positioning devices are disclosed, for positioning the user's hand in closed grip position, with the knuckle surfaces presented for scanning.

To secure transaction approval, or to gain access to a secured zone (Guarded Station), the user presents a fist, whereupon the apparatus generates a signal representing the user's knuckle profile across the fist, for matching to the user's previously stored template. If the match score is high enough to meet or exceed a predetermined level (threshold score), the user is accepted for transaction, or granted access. In some highly secure applications, apparatus may require that the user be accepted only after presenting both fists in turn, to match with corresponding dual templates. In another embodiment, the system requires that two different persons be verified and accepted, in combination, e.g., a user and a security officer.

Searching for the user's template(s) may vary in different system configurations. The user's template may be stored in a database or on a card (e.g., a magnetic stripe card, or a smart card). Other data pertinent to the user may also be stored on the card or in the database, such as name, bank account number, Social Security number, or a PIN, depending on the application. The DSP generates a knuckle profile from the video camera output, and a comparator matches the profile to the previously stored template. The comparator (which may be in a microcomputer) uses Pearson's regression analysis formula, or equivalent, to assess the quality of the match. The resulting match score, expressing the degree of congruence between the profile and template, is compared to a minimum acceptable threshold score and results in either an Accept or a Reject signal or message.

DESCRIPTION OF THE PREFERRED EMBODIMENT

Figure 1:
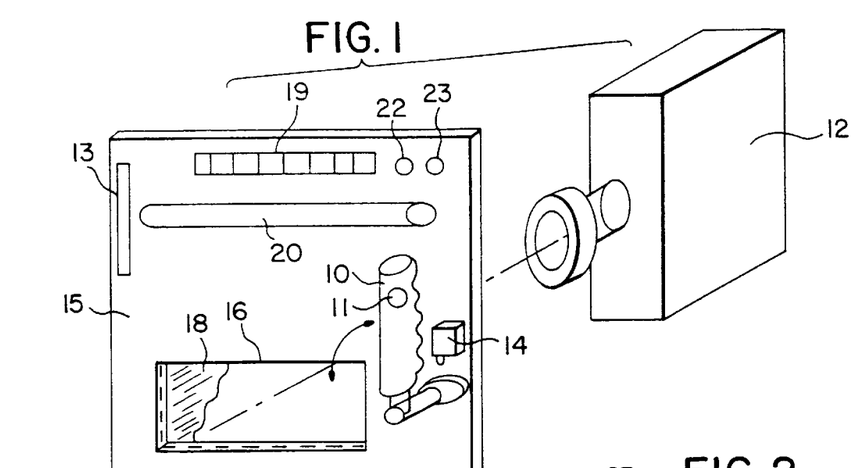
FIG. 1 is a schematic perspective view of the preferred form of apparatus provided by the invention.

Referring to FIG. 1, the apparatus portion of the system is mechanically and electronically simple, accurate and reliable. Its low cost makes it economically attractive for large-scale commercial, industrial, and government/military uses. Since this invention uses knuckles rather than spread fingers, mechanical means (posts, grooves, or guide plates) are not needed to position the hand and fingers. Likewise, normalizing computations are not required because knuckles have no features to realign, and a grip handle 10 (e.g., a bicycle grip) fixes the fist orientation, and initiates system operation when the handle is turned to a stop.

The method of capturing the knuckle image, extracting and storing the profile (knuckle template) for later reference is accomplished by a simple CCD (charge coupled device) black-and-white video camera 12 trained on the fist in grip configuration, preferably head-on, or alternatively from above the wrist. A vertical metal face plate 15 with a window cut-out 16 serves as a screen to separate the camera from the fist. When the user grasps grip handle 10 with either hand and turns the handle to the horizontal position (counterclockwise as viewed in FIG. 1) the knuckles are in the correct position to be viewed by a scanning device such as camera 12 focused through window 16 or the fist. This action actuates a switch 14 (e.g., a cam-operated switch) to generate a signal that the fist is in position for capturing its image by the camera and for generating the knuckle surface profile. The window opening is covered by an infrared (IR) filter 18 so only IR light will form the knuckle image on the camera's CCD array, thereby excluding stray ambient light, thus increasing the contrast between the fist and its surroundings. (All skin colors appear red to the camera).

An overhead tubular incandescent lamp 20, mounted on the face plate 15, provides uniform illumination of the knuckles 25 and the four and the four proximal metacarpal are their interphalangeal joints 26 (see FIG. 3) as the camera views the fist head-on. The lamp 20 is continuously energized at low voltage so as to produce predominantly red light and to achieve long operating life. A video monitor 30 (FIG. 5), when connected for alignment and maintenance purposes, captures the head-on fist image, which appears bright against a dark background. Since the goal is to generate the knuckle profile, the camera scanning is arranged so that the scan lines 32 run side to side over the fist from the proximal joints up the fingers to the knuckles 25. This differs from conventional orientation where a video raster scans consecutive horizontal lines, progressing downward, as one would read a printed page.

The reason for this scan orientation is that the scan lines, starting just below the proximal interphalangeal joints will register dark at first until they encounter the brightly lighted fist. When the scans reach the MCP joints at the knuckles (and thus pass beyond the fist) there is an abrupt switch to dark. Thus, each scan line will have two transitions: one at the proximal interphalangeal joints 26 and one at the knuckle 25.

Figure 2:
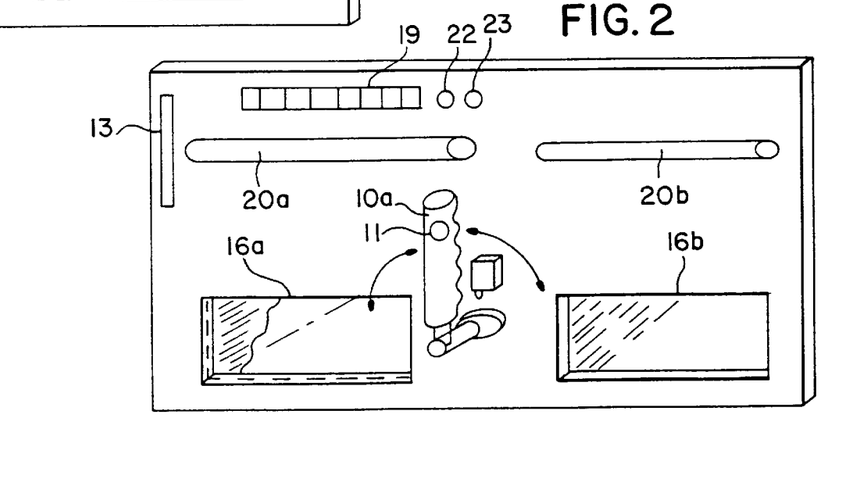
FIG. 2 illustrates a modified grip and knuckle locating device wherein the grip can be swung before either of two viewing windows, depending whether the right or left hand and fist is being presented.

FIG. 2 shows a modification using the same general swinging grip configuration as in FIG. 1, but used with two viewing windows 16a, 16b so the grip may be moved (swung) before the right window 16b if a left fist is presented, and before the left window 16a if a right fist is being presented.

An alternative embodiment of the grip mechanism for positioning the fist and presenting the knuckle surfaces may reduce the opportunity of destruction by vandalism. A roller handle 10A (FIG. 3A) is oriented vertically and supported with ball bearings at both ends so as to be rotatable on its axis. The user grasps and turns the handle with the right hand to activate the camera, rotating the handle counterclockwise until it reaches an appropriate stop.

Figures 3A, 3B, 3C:
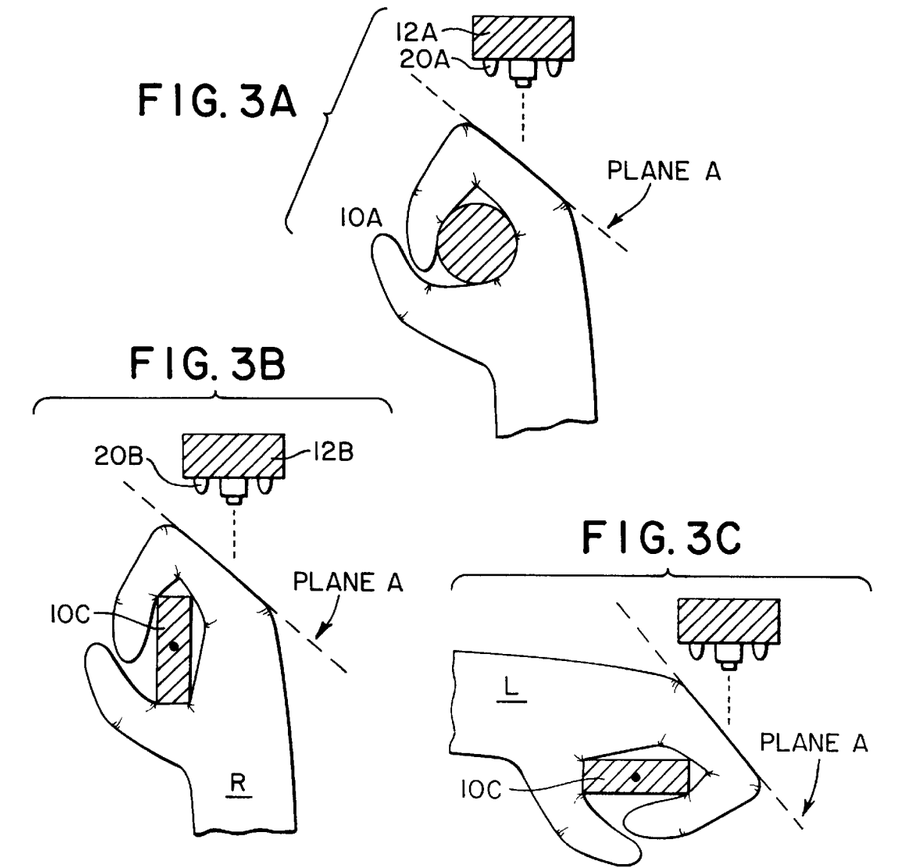
FIGS. 3A and 3B, 3C show modified grip devices for positioning the knuckles.
Figure 5:
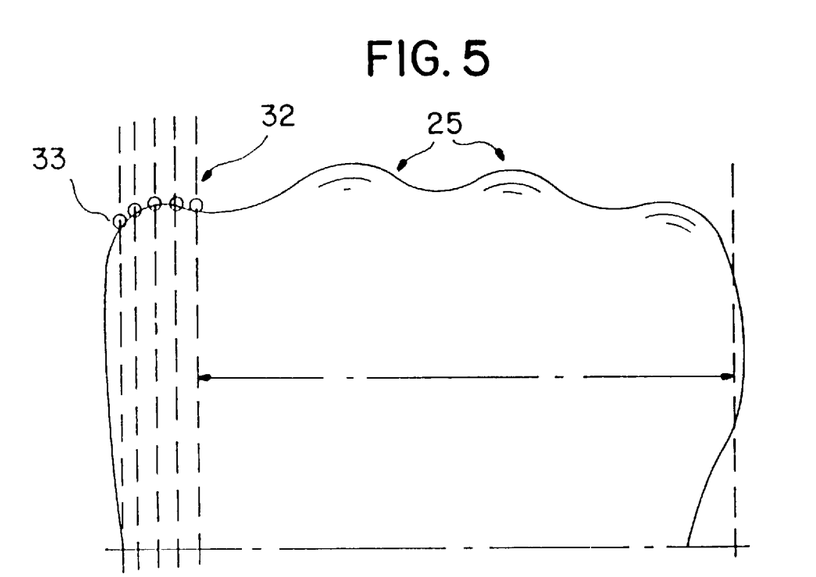
FIG. 5 is a diagram of an alternate configuration, using an overhead or top view of knuckles with the camera viewing the back of the hand.

In this embodiment the video camera begins recording the fist image when handle 10A is first turned. The rotation may take about ½ to 1 second during which the camera records a sequence of, or example, 15 to 30 fist images at 30 frames per second until the handle reaches the stop. A circuit selects that frame which maximizes the peak-to-valley of the knuckle surface contour. The camera 12A may be fitted alternately with infrared lights 20A to illuminate the fist. The knuckle surface profile, extracted from the fist image by an electronic edge-detection circuit, as shown in FIG. 5, but rotated ninety degrees to indicate that the fist is now oriented vertically. [The camera is oriented in conventional position so that the scan lines now run horizontally the user's knuckle surface contour is then stored digitally on a magnetic card or in a local or remote data base. This contour is the template to be compared with the knuckle contour (the profile) when the user's identity is to be verified. In case the user has not rotated handle 10A far enough to reach the stop, a message panel will call for a retry, otherwise the selected profile will be matched with the previously stored template, and the message panel will indicate an accept or reject decision.

Another alternative embodiment of the grip mechanism for capturing the knuckle image has fewer parts than the lever-handle version shown in FIG. 1. A vertical handle 10C is provided in the form of a bar of oblong cross-section, FIG. 3B. Handle 10C is securely fixed at both ends, as in sturdy mounting blocks (not shown), to prevent vandalism. The bar handle 10C cannot rotate freely about its axis, but can locate at either of two angular orientations, as explained later. The oblong cross-section prevents arbitrary orientation of the proximal phalanges with respect to the scanning mechanism. Generally, this will ensure that the captured knuckle surface image will be consistent whenever the user grasps the bar. When the user grasps the handle bar 10C with the right hand, Plane A formed by the proximal phalanges is at an angle of approximately 45 degrees to the camera lens. At this viewing angle the video camera will record the prominent peaks and valleys of the knuckle surface image. To accommodate the left hand, (FIG. 3C) the user may turn handle 10C 90 degrees where it is held securely in place by detents (not shown). Thus, the handle can take up either of two fixed positions depending on which hand the user chooses.

Figure 7:
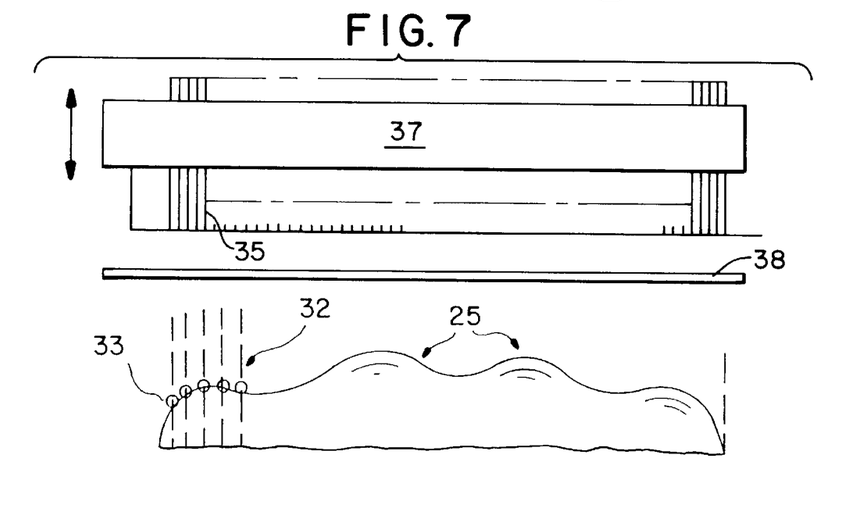
FIG. 7 is a schematic view of an electro-mechanical device in place of a camera for extracting the knuckle surface profile.

Instead of a camera view overhead an equivalent electromechanical scanning device (FIG. 7) comprises a set of small tines 35, independently movable parallel to each other in a holder 37, so as to conform to the knuckle surface profile when the knuckles are forced into contact with tips of the tines 37 and thus the tips reproduce the shape of the knuckle surface contour. The resulting contour defined by the position of the tines is then scanned by a conventional solid state scanner 38 or by a tines position sensing means (not shown) to generate a signal which represents the individual's presented profile.

Either a video camera or an electro-mechanical profile sensing device can be utilized with any of the various grip/positioning mechanisms disclosed. At the entryway the processing of the knuckle profile information is accomplished in the same manner as shown in FIG. 5 and described in the parent application Ser. No. 08/267,584.

Alternative devices to capture the knuckle contour also embody the set of movable tines as described above. As before, the user candidte makes a fist and presses the knuckles against the tines, which conform to the knuckle surface contour. The contour represented by the tine tips is reproduced on a key duplicating machine, for example at half size. From such personal key a conventional lock is made, with tumblers which accomodate this personal key. Thus, the new lock is equivalent to the template, and the new personal key is equivalent to the knuckle surface profile.

In a typical automotive application (for example) such unique new lock can be arranged to control a switch in series with the automotive ignition key-switch, and the car's engine can only be started with the user's personal key. An over-ride switch, or additional new personalized lock-switches connected in parallel to such unique key-switch, can be provided to permit other approved drivers to start and operate the car.

Another use of the grouped movable tines can be constructed by transferring the contour of the tine tips (after being conformed to the knuckle surface contour) to a pair of relatively thin metal blocks, thus producing a template and a matching receiving profile. The blocks can be inserted in a box, positioned by detents before a slot which is aligned with the mating profile and template. By directing a light against one face the intersection of the profile surfaces, and placing a photodetector on the opposite side of those surfaces, it is possible to determine whether the profiles match and exclude passage of light.

The apparatus portion of the system is mechanically and electronically simple, accurate and reliable. Its low cost makes it economically attractive for large-scale commercial, industrial, and government/military uses. Since this invention uses knuckles rather than spread fingers and reproduces the knuckle surface, mechanical means (posts, grooves, or guide plates) are not needed to position the fingers. Normalizing computations are not required because knuckles have no features to realign, and a grip handle (e.g., a bicycle grip) fixes the fist orientation, and can be used to initiate system operation.

If the apparatus uses only the knuckle surface pattern or waveform for ID verification, it is depending on comparison of only a single pair of waveforms to perform the verification. Experience with the apparatus cited in U.S. Pat. No. 5,073,950 shows that the larger the number of match pairs, the smaller the chances for error. This is why that apparatus was based on matching four finger three ways (finger length, width, and shape). For this reason the present invention can take advantage of the joint profile 26, especially when the joint profile is available with only a minor overhead penalty. No new circuitry is required, but simply a change in the algorithm to extract the additional waveform. Whether incorporation of the joint profile waveform is warranted depends on the error rate specifications of a particular application.

About one point per millimeter at the knuckle will adequately describe the shape of the knuckle profile. A 4" (100 mm) wide fist is adequately depicted by 100 points rather than 400 or 500 points, which would be the width measured by the CCD camera. Too many data points simply increase the computation time. Therefore, a video line counter circuit can be installed and used to record knuckle contour data points only every fourth or fifth scan line.

A preferred comparison formula to determine the degree of congruence between a profile and a template is $r^2$, Pearson's coefficient of determination. For a perfect match, $r^2=1.0000$. Moving the decimal point for convenience, a perfect match yields a match score of 100.00. Such a high score is almost never achieved, but usually the score lies between 97.00 and 99.00 using the system of the present invention. A typical threshold score from prior experience is about 96.50, which must be equalled or exceeded by the match score for the user to "pass" the biometric test. In any test of this type there is always a chance that the device will make an error, by accepting an unauthorized person (Type II error), or rejecting an authorized person (Type I error). If a military or other high security facility wants to be sure not to accept an unauthorized person, it will set the threshold score to a high value and run the risk of occasionally rejecting an authorized person. So, setting of the threshold score can be made adjustable according to the particular application of the system.

A method of verifying the identity of an individual by generating and storing a template which describes the shape of the individual's four knuckles, much like contouring a chain of mountains and valleys and by comparing this shape with a profile generated at a Guarded Station. If the template and profile shapes match to an acceptable degree, the individual's identity is judged to be verified and the person is granted entry (or transaction) access.

It is possible to generate an even smaller biometric discriminant based on the knuckle profile by recording only the locations of the peaks of all four knuckles and measuring the distances between the first peak and each of the other three peaks. There would be three such numbers to the nearest 0.1 millimeter. A very large male fist would be about 6" (150 mm) wide. Hence, the largest decimal number to record would be about 1500, or an 11 bit binary number. Alternatively, a discriminant of even smaller size can be made by recording only the number of points separating each peak from its neighbor. Thus the location of only four points summarizes the salient features of the erstwhile 100-point profile, and another three points corresponding to the valleys can add to the discriminating power of the apparatus. This software change reduces the profile shape to a saw-tooth. The penalty of decreasing the profile size by quantizing the profile shape will be an increase in the Type I and Type II error rates. But such increases may well be tolerated in certain applications. The benefit can be a substantial reduction in computation time, and consequently in accept/reject decisive time.

A small template size makes possible the rapid riffle mode described in said parent application because a very large number of match scores must be computed as the database is searched to find the user's template. A Type II error could occur if the match score from a comparison of the user's profile with a another user's template in the database exceeds the threshold score. In lieu of a magnetic stripe card or smart card, the apparatus can store the templates of the authorized users in an internal or remote database and retrieve any desired template by means of a keypad, proximity card, or touch screen.

The riffle mode does not require use of any device or card or PIN to retrieve a template. The user does not need to carry a card or remember a PIN. The user simply grasps the handle 10 and turns it to the horizontal. The user's profile thus generated is recorded in a temporary buffer in the digital signal processor where it is rapidly compared for congruence in sequence to each template in the database to find the template with the highest match score at or above the preset threshold score.

Knuckle profiles exhibit by their very nature broad peaks and valleys and are therefor prone to yield equivocal locations. A method to sharpen up the waveforms is to apply a convolution algorithm called autocorrelation, and then extract peak and valley locations. The method functions as follows:

1) Copy the portion of the knuckle waveform that corresponds to the second phalanx (index finger);
2) Superimpose the copy over the portion of the waveform that corresponds to the fifth phalanx (pinky);
3) Compute $r^2$, then shift the copy in one point increments computing $r^2$ at each shift to produce the autocorrelation waveform.

The reference point (at $r^2=1.0$) occurs where the copy rests on its parent. The autocorrelation waveform will reveal the precise number of points that separate each peak and valley from the reference point. Autocorrelation curve data of all authorized persons can be stored in an auxiliary database, and in a second auxiliary database in the form of peak/valley locations, thus greatly reducing the template size, although at some sacrifice of the actual shapes of the peaks and valleys. These two auxiliary databases can be used to great advantage in the riffle mode, where high speed template matching is essential. Suppose that the riffle mode now finds three probable matches out of 1500 persons in the peak/valley database. It would be easy then to refer to the (parent) template database so as to find out which one of the three is the user being sought. This procedure, known as "triage", can greatly speed up the search of a large database.

Figure 4:
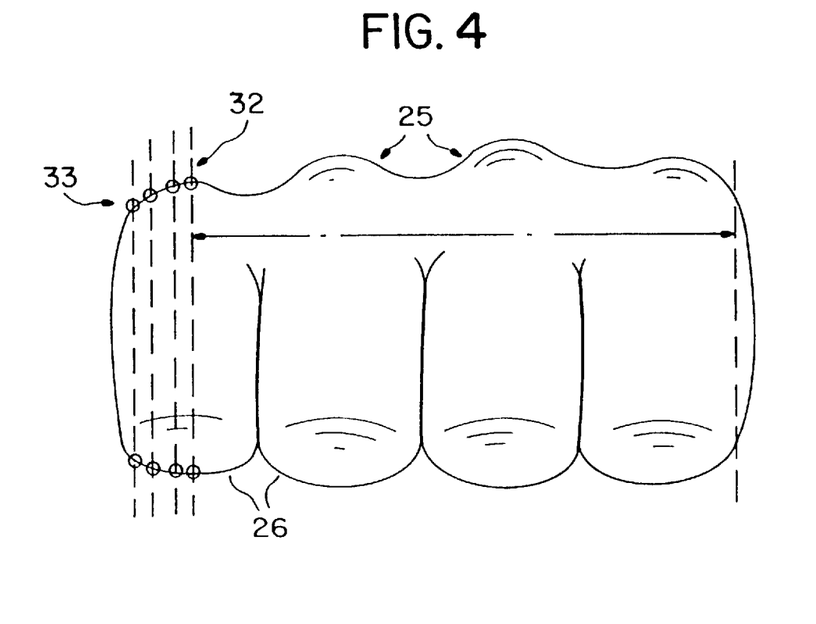
FIG. 4 is a diagram of the frontal (head-on) view of knuckles of one hand when in the grip position, illustrating the scanning sequence of the knuckle surface profile.

FIG. 4 shows what the camera 12 sees when viewing the fist head-on. The image appearing on the monitor 30 is dark above and below the knuckles. The scan lines are shown schematically as dotted lines as they progress from the proximal finger joints upward toward the knuckles. As each scan line arrives at the knuckle boundary a transition from bright to dark occurs abruptly, marking one point 33 on the knuckle profile. Likewise at point 34 occurs at each dark to bright transition on the proximal interphalangeal joint profile.

FIG. 5 (another embodiment) shows what the camera sees when viewing the illuminated fist from above the wrist joint, using a modified camera orientation. The raster scan lines again are shown schematically as dotted lines as they progress from the wrist toward the knuckles.

Figure 6:
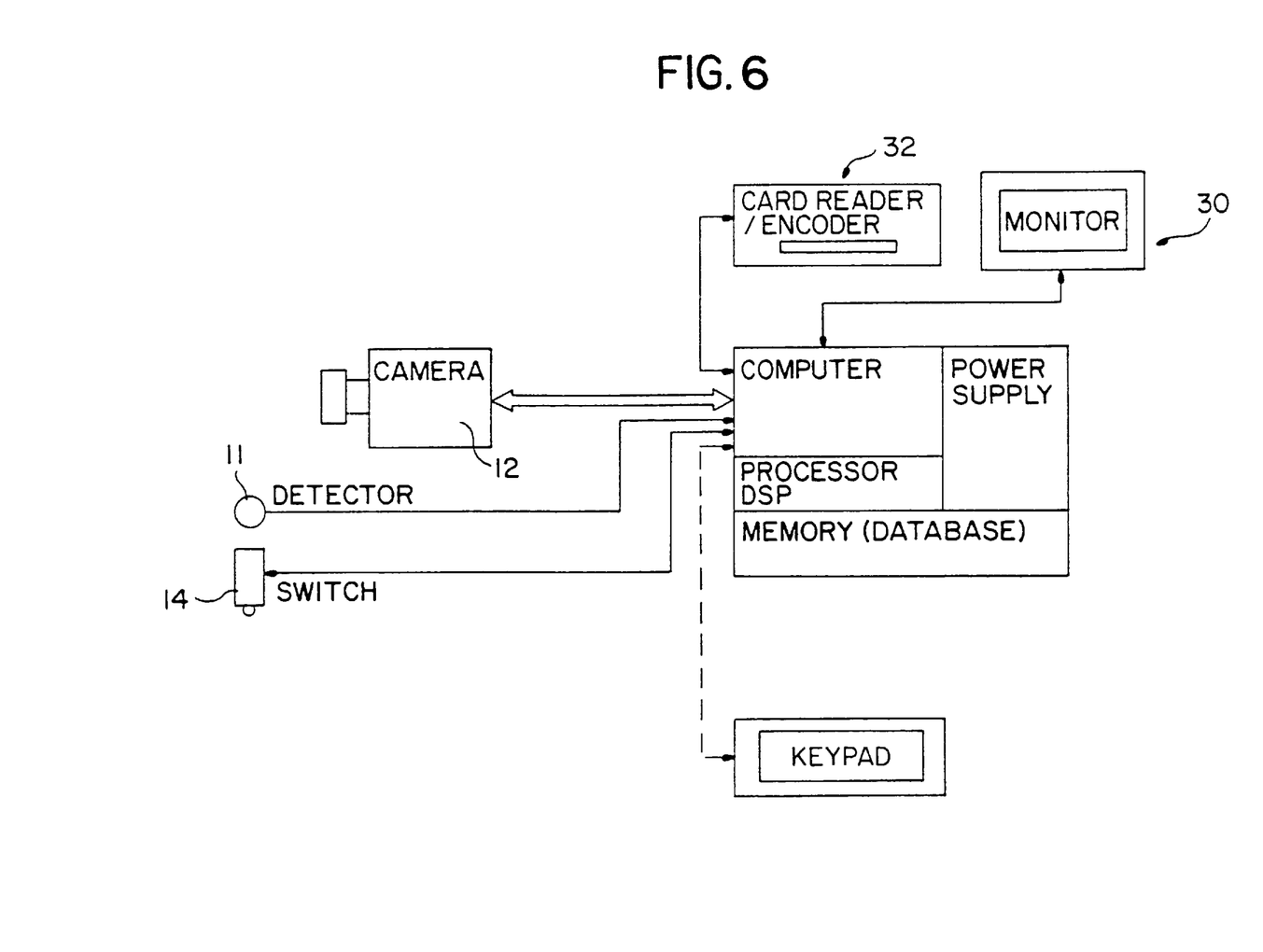
FIG. 6 is a block diagram of the over-all system.

An optional speaker, buzzer, or klaxon (not shown) can be mounted behind face plate 15 to signal audibly a REJECT decision. FIG. 1 shows an optional pair of red and green lights 22, 23 on the face plate to display an accept or reject message. Mounted on the back of the face plate 15 is a card reader/encoder 34 (FIG. 6), and on the front of face plate 15 is slot 13 to accept a user's ID card. In other versions there may be no card reader/encoder or slot, but a keypad instead, to enter a PIN to retrieve a selected template from a database.

Typical Operation of the System

Following are the steps to enroll a user:

1. a security officer places a formatted magnetic stripe or smart card in the reader/encoder slot 13, and instructs a new user to grasp and turn the grip handle 10 counterclockwise until it reaches a mechanical stop at its horizontal position;
2. this action triggers the camera to capture the fist image;
3. the scanned area of the fingers, from the proximal joints up to the knuckle boundary is illuminated by lamp 20, and camera 12 records the fist image head-on through window 16 and IR filter 18; scan lines are parallel to the fingers (FIG. 4), originating at the proximal finger joint boundary 26 and progressing upward across the knuckle boundary 25; each scan line is therefore bright until it reaches the knuckle boundary whereupon it abruptly goes dark;
4. an edge detector circuit marks this boundary as a series of points delineating the knuckle profile;
5. a video scanning raster of some 400–500 lines provides a surfeit of points to define the profile, however to reduce the number of points to a spacing of one millimeter at the fist, a line counter circuit can select every fifth line as sufficient to delineate the profile;
6. the profile of four peaks and three valleys is stored as a template on a card or in a database along with an assigned PIN; other pertinent data may also be stored on the card (or in an internal or remote memory), e.g., user's name, bank account number, Social Security Number, depending on the particular application.

To gain approval, or access at a Guarded Station, with a card version:

1. the enrolled user tests his newly made card by inserting it into the card reader/encoder slot 16;
2. the user grasps the vertical grip handle 10 and turns it to the horizontal position, thus orienting the fist in the correct position for the camera to capture the knuckle image;
3. the DSP converts each of the 400–500 scan line from the camera to a knuckle profile (typically of stet 150 data points, depending on the size of the user's fist), and the circuit compares it to the previously stored template which has been retrieved from the card or from the database by means of the #1N.
4. a comparison routine using Pearson's regression analysis formula ($r^2$) assesses the degree of congruence between profile and template, $r^2$ @ 100.00 indicates a perfect match.
5. if approval or access is granted, the green panel light 23 will glow and/or the message panel will display ACCEPT, or WELCOME MS. SMITH, depending on the design of a particular system;
6. if access is denied, the red panel light 22 will glow and/or the message panel will display REJECT, and (optionally) an alarm (tone, buzzer, klaxon) may sound.

The methods herein described, and the forms of apparatus for carrying these methods into effect, constitute preferred embodiments of this invention. It is to be understood that the invention is not limited to these precise methods and forms of apparatus, and that changes may be made in either without departing from the scope of the invention, which is defined in the appended claims.

What is claimed is:

1. A biometric hand geometry method for preparing a unique identity characteristic of a user based on at least one fist in grip configuration by creating and storing as a template a reference profile of the undulating peaks and valleys of a knuckle surface contour unique to each user, the method comprising the steps of
   a) positioning the user's knuckles of said one fist with respect to a device which captures the undulating contour of the knuckle and interphalangeal joint surfaces,
   b) scanning the surface of the knuckles, the successive scan lines running from the interphalangeal joints to a position on the knuckle,
   c) extracting the knuckle surface contour as a smooth curve defined as a sequence of discrete points on the knuckle contour,
   d) storing the knuckle surface contour as a template in a storage medium.

2. The method as defined in claim 1, further comprising
   f) storing, along with the user's template, unique user data the user's assigned personal identification number, name, Social Security number, and/or account number.

3. A method according to claim 1, for verifying a user's identity by performing the preparation steps of claim 1, and then
   g) generating the user's knuckle contours as profiles, and
   h) comparing the user's profile with the user's previously stored template,
   i) determining the degree of congruence between the user's profile and template by calculating a numerical match score,
   j) testing for the degree of congruence by comparing the match score with a predetermined threshold score, and
   k) determining whether the user is to be accepted or rejected based on the results of the threshold test.

4. The method set forth in claim 3 wherein the templates of all authorized users are stored in a database, and step (g) is performed by riffling through such database, comparing the user's profile with each stored template, and selecting the stored template with the highest match score, and step (j) is performed by comparing the selected template with the threshold score and making an accept decision if the threshold criterion is met.

5. A method according to claim 1, for verifying a user's identity by performing the preparation steps a) through d) of claim 1 for a number of different users, and then
   e1) storing the knuckle surface contours of all users as templates in a database,
   g) searching the database to match the user's profile with the user's previously stored template,
   i) determining the degree of congruence between the user's profile and a template selected in step g) by calculating a numerical match score,
   j) comparing the match score with a predetermined threshold score, and
   k) determining whether the user is to be accepted or rejected based on the magnitude of the match score in relation to the threshold score.

6. A method as defined in claim 1, wherein
   step (b) is performed by an electronic video camera and associated edge detector, said camera generating scan lines intersecting the images of the successive proximal interphalangeal joints and intersecting the knuckle images, said edge detector extracting the user's knuckle and interphalangeal joint contours from the illuminated fist image and thus generating the knuckle profile.

7. A method as defined in claim 6, wherein a combination of a CCD video camera, an incandescent lamp, and an IR filter are used to insure that high contrast is achieved between the knuckle and interphalangeal joint images and surroundings, independent of skin color.

8. A method according to claim 1, wherein step (b) is performed by an electromechanical device having a set of independently movable parallel sensor tines contained in a holder supporting said tines for contact with the fist, moving said set of tines to conform to the knuckle surface whereby the tips of the tines assume the knuckle surface contour, and sensing and recording the curve defined by the so positioned tines to extract the knuckle surface contour.

9. A method as defined in claim 1, where in
   step (b) is performed by an electronic video camera and associated edge detector, said camera generating scan lines defining the knuckle surface as imaged from the back of the hand, said edge detector extracting the user's knuckle contour from the illuminated fist image.

10. In the method of claim 1, adjusting the threshold score to meet the needs of the facility served, thus relaxing either the Type I error rate or the Type II error rate at the expense of the other.

11. The method set forth in claim 1, wherein the knuckle surface image is scanned from a head on position viewing the knuckles and their profile from the proximal joints of the fist.

12. The method of claim 1, including the additional step of
   d1) decreasing the size of a profile and template by recording only the distances between the knuckle surface peaks and valleys and storing such modified contours as a template in an auxiliary database.

13. The method of claim 1, further including
   d1) sharpening the peaks and valleys of the knuckle surface profile by convolving the profile using an autocorrelation algorithm, then storing the resulting autocorrelation curve information as the template in an auxiliary database for later matching to an autocorrelation curve similarly generated from a user's profile.

14. The method of claim 1, further including
   c2) extracting a contour of the proximal interphalangeal joints in addition to the knuckle surface contour,
   d2) digitizing the joint contour in addition to the knuckle surface contour, and
   wherein step (e) stores both the digitized knuckle surface contour and digitized joint contour as a template.

15. An apparatus for verifying the identity of a candidate user based on a knuckle surface contour of at least one fist, comprising
   a face plate having a first viewing window therein of a size to accommodate the area encompassing the knuckles and proximal interphalangeal joints of a closed fist,
   a grip handle for the candidate user to grasp so as to bring his closed fist into position for viewing through said window,
   means mounting said grip handle for pivotable motion before said window, whereby grasping said grip handle in front of said window will locate the fist for viewing through said window,
   scanning means mounted so as to view and record through said window an image of the knuckle surface of a fist, said scanning means generating a scan-type output waveform signal, successive scan lines running from the interphalangeal joints to a position on the knuckles, signal processing means for receiving said output signal and transforming said output signal into a digitized contour of the knuckles surface, and means for storing the digitized contour signals in memory as a template.

16. An apparatus as defined in claim 15, wherein said scanning means is an electronic camera.

17. An apparatus as defined in claim 15, wherein said scanning means includes a mechanical array of movable tines conformable to the knuckle surface contour of the fist, and a means for sensing the tine positions whereby the tips of the conformed tines describe the knuckle surface contour, and means for generating the output waveform signal corresponding to the knuckle surface contour from said sensing means.

18. An apparatus as defined in claim 15, wherein said grip handle is pivotally mounted to one side of said window and is movable into a scanning location extending across the view through said window.

19. Apparatus as defined in claim 18, further including a second viewing window located in spaced relation to said first window and said grip handle, said mounting means for said grip handle providing for turning of said grip handle to positions in front of either of said first and second windows, whereby users can present one fist before said first window and a second fist before said second window, said camera viewing and scanning the images through said windows in sequence and said digitizer means transforming the two images into a combined output signal for storing as a single template.

20. An apparatus as defined in claim 15, wherein said grip handle extends vertically within the view through said window, the scanning means being arranged to follow horizontally extending, vertically spaced scan lines over a fist formed around said grip handle.

21. An apparatus as defined in claim 15, wherein said grip handle is mounted extending across the view through said window, and bearings supporting said grip handle for rotation about an axis extending lengthwise of said grip handle.

22. An apparatus as defined in claim 15, wherein said grip handle is non-circular in cross-section, means supporting said grip handle for motion about an axis extending lengthwise of said grip handle, and stops limiting such motion to two positions approximately 90 degrees apart.

23. Apparatus as defined in claim 15, further including a card reader/encoder for storing a user's template waveform signal to be possessed by the user associated therewith.

24. Apparatus as defined in claim 15, further including means providing a database memory for storing individually as templates the contour signals from the digitizer means, and means for comparing the stored templates with a digitized profile to determine congruence between the profile generated from a user's knuckles and a selected one from among the stored templates.

* * * * *